United States Patent [19]

Snyder

[11] Patent Number: 4,674,615

[45] Date of Patent: Jun. 23, 1987

[54] HYDRAULIC CLUTCH #III

[76] Inventor: Wayne E. Snyder, 501 Orchard St., Dowagiac, Mich. 49047

[21] Appl. No.: 788,979

[22] Filed: Oct. 23, 1985

[51] Int. Cl.⁴ ............................................. F16D 31/04
[52] U.S. Cl. .................................. 192/61; 192/67 R; 192/85 V; 418/21
[58] Field of Search ............. 192/58 R, 60, 61, 85 V, 192/67 R, 85 A; 418/21; 74/782, 784

[56] References Cited

U.S. PATENT DOCUMENTS

| | | | |
|---|---|---|---|
| 564,488 | 7/1896 | Johnson | 192/48.91 |
| 2,015,143 | 9/1935 | Holmes | 192/61 |
| 2,262,331 | 11/1941 | MacNeil | 418/21 |
| 2,325,814 | 8/1943 | Tyler | 192/105 R |
| 2,464,975 | 3/1949 | Gibbs et al. | 192/854 |
| 2,482,313 | 9/1949 | Bascle | 192/61 |
| 2,498,733 | 2/1950 | Boxer | 192/61 |
| 2,704,141 | 3/1955 | Doshier | 192/161 |
| 3,145,816 | 8/1964 | De Lorean et al. | 192/91 R |
| 3,189,151 | 6/1965 | Sullivan | 192/85 V |
| 4,078,453 | 3/1978 | Brace | 74/782 |
| 4,564,095 | 1/1986 | Lackey | 192/59 |

FOREIGN PATENT DOCUMENTS 560326   3/1944   United Kingdom .................. 192/61

Primary Examiner—John E. Murtagh
Assistant Examiner—Andrew Joseph Rudy

[57]  ABSTRACT

A hydraulic clutch device which uses a gear pump design as its main element which, in effect, has nowhere to pump.

Its center gear is driven by the input shaft while its housing unit can also rotate and comprises the output shaft.

The center gear meshes with two outer gears and also slides axially so that the amount of its teeth that mesh with the outside gears can be varied. The axial movement of the center gear being achieved with hydraulic pressures and vacuums supplied from within the clutch itself and controlled by a central control slide valve which runs through the center of the input shaft and is controlled by a manually operated lever attached to the supporting framework and coupled to the slide valve with a throwout bearing device.

By moving the center gear over so that it fully meshes with the outer gears the clutch is engaged, and by moving the center gear over the other way so that only a small portion of it meshes with the outside gears the clutch is disengaged.

2 Claims, 3 Drawing Figures

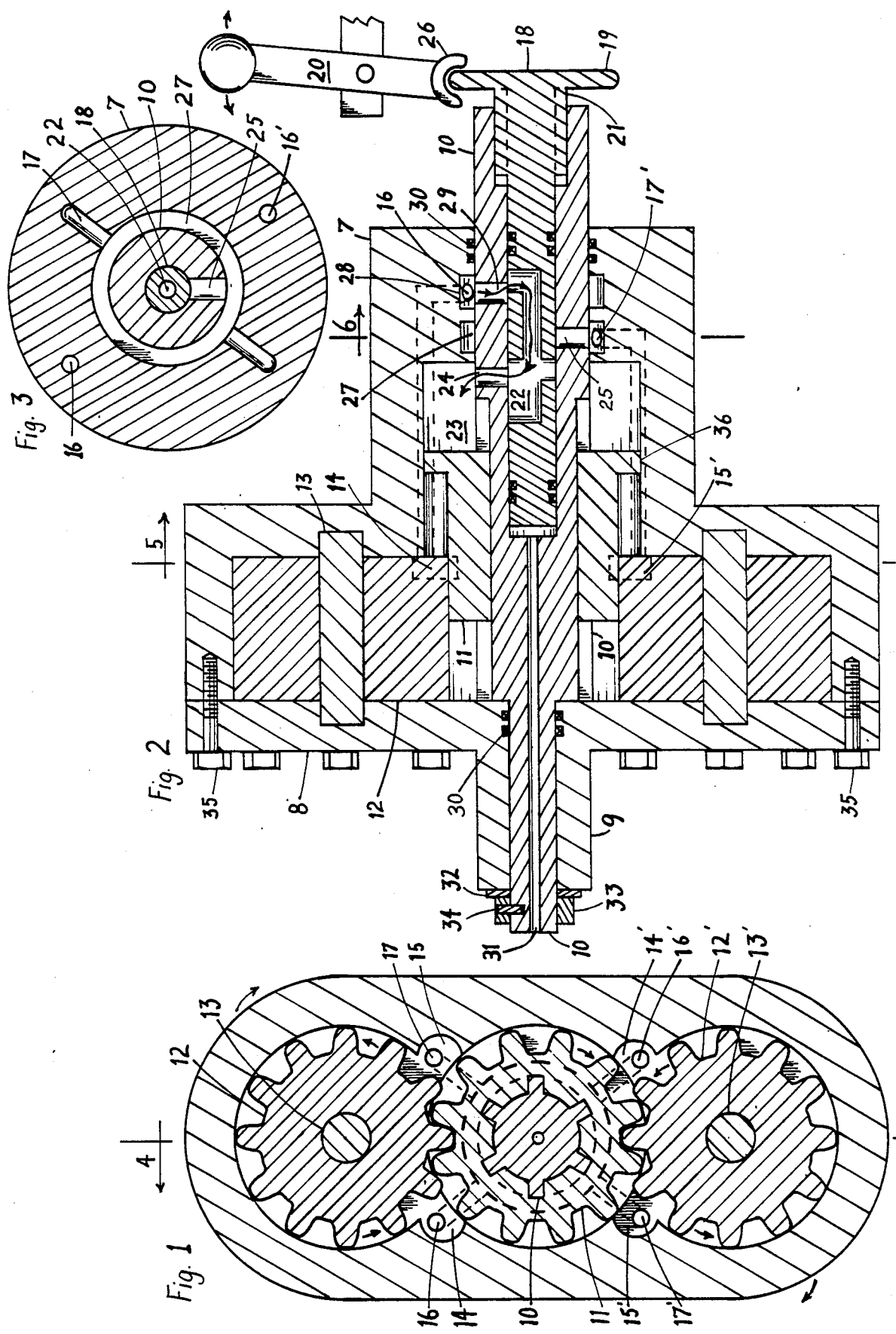

HYDRAULIC CLUTCH #III

CROSS REFERENCE TO RELATED APPLICATIONS

This hydraulic clutch can be used for the transmission of torque power in any machinery or transportation vehicle where a clutch device is needed. It is especially adaptive to automotive transmissions.

The basic principle of the hydraulic clutch has been used in several previous patents; J. A. Bascle U.S. Pat. No. 2,482,313, August 1949; and L. E. Dosher U.S. Pat. No. 2,704,141, March 1955.

These previous designs have been impractical because of their complexity of parts and because there is a continual resistance to rotation while they are in the neutral position. My invention overcomes these disadvantages and is practical for commercial application.

SUMMARY OF INVENTION

My invention is an improved form of hydraulic clutch. It uses a basic gear pump design which, in essence, has nowhere to pump. The input shaft drives a central gear while the housing unit also can rotate and drives the output shaft. The central gear meshes with two outer gears and with the aid of the outside housing forms two gear pump configurations. The center gear is splined to the input shaft and is capable of sliding axially on it so that the length of the center gear's teeth that are meshing with the two outer gears can be varied.

When all of the center gear is meshing with the two outer gears the clutch is engaged because the two gear pumps that are formed have nowhere to pump and so the entire clutch unit is forced to rotate with the input shaft. When the center gear is slid axially away from the two outer gears the clutch disengages because even through the center gear still partially meshes with the outer gears they no longer form a closed gear pump configuration, (the hydraulic fluids can flow around the ends of the center gears teeth), and so the outer gears can turn freely without forcing the housing unit to rotate.

The axial movement of the center gear is achieved by using hydraulic pressures supplied from within the clutch itself and controlled by a central slide valve which is controlled by a manually operated outside lever coupled to a throwout bearing device.

A big advantage of this hydraulic clutch design over previous designs is that when it is disengaged there is practically no pumping action taking place and so no internal resistance or wasted energy. Another advantage of this design over previous designs is its overall simplicity and small number of parts.

A big advantage of hydraulic clutches in general, (over friction clutches), is their ability to be engaged slowly and evenly without wear on their parts which makes ideal for adaption to automatic transmissions, (thereby eliminating the need for fluid coupling devices).

BRIEF DESCRIPTION OF DRAWING

One sheet of drawing is included.

FIG. 1 is a front cross sectional view of the main unit taken along line 5 of FIG. 2 showing the drive shaft; the center gear; the two outer gears; the four collection cavities; and four ports and their fluid lines, (in broken lines).

FIG. 2 is a longitudinal sectional view of the entire unit taken along line 4 of FIG. 1 showing the central slide valve and its connecting ports and supply lines; the mannual control lever and throwout bearing device; the front plate and output shaft; the back plate and its annular ports; the splined input shaft with its three valve lines; and the three gears.

FIG. 3 is a cross sectional view of the rear housing plate taken along line 6 of FIG. 2 showing some of the valve ports and supply lines.

No oil fill hole is shown.

DETAILED DESCRIPTION

In FIG. 2 can be seen the housing unit made up of the front plate #8 and the rear plate #7, held together by the machine bolts #35, The output shaft #9 is fixed to the front plate #8. The input shaft #10 goes through the entire unit and emerges from the output shaft #9 where it is held in place by the holding ring #33 which is secured to the input shaft with the pin #34. The input shaft #10 is intended to extend out farther from the holding ring #33 than what is depicted in the included drawing so as to facilitate its connection with an outside driving device. The holding ring #33 is separated from the output shaft #9 with the washer bearing #32. The input shaft #10 is splined where the gear #11 fits over it and these splines engage reciprical splines inside the center gear #11 and allows said gear to slide axially on it. The input shaft also has three valve lines in it; #24, #25, #29. Through the center of the input shaft #10 runs the control slide valve #18. It slides axially within the input shaft and is operated with the manual control lever #20 which is supported on the supporting framework (not shown) and which has a throwout bearing device #26 on its end which couples with the wheel #19 fixed on the end of the control slide valve #18. The control slide valve #18 also has splines #21 on one end and fits the splines inside the input shaft to keep them rotating in unison while allowing the control valve to slide axially within the input shaft #10. Inside the control slide valve #18 is the valve line cavity #22 with three orifices.

Through the center of the input shaft #10 runs an air displacement line #31. Four sets of hydraulic seals are shown in solid black #30.

In FIGS. 1 and 2 are shown the outer gears #12 and #12' with their bearings shafts #13 and #13'.

In FIG. 2 is shown the center gear #11 with the end lip #36 which seals the slide cavity #23 so that pressure inside the cavity, #23, will force the center gear #11 to slide axially.

In FIGS. 1 and 2 can be seen the four collecting cavities. Cavities #14 and #14' are pressure collection cavities while #15 and #15' are vacuum collection cavities. Fluid lines #16 and #16' are pressure lines while fluid lines #17 and #17' are vacuum lines. Pressure lines #16 and #16' connect the pressure collection cavities #14 and #14' with the annular port #28. Vacuum lines #16 and #16' connect the vacume collection cavities #14 and #14' with the annular port #27.

OPERATION

In FIG. 1 the center gear #11 is turned clockwise by the input shaft #10. The center gear #11 is always meshing to some extent with the two outer gears #12 and #12', and so turns them counter-clockwise. The clutch unit is filled with hydraulic fluid. As the outer gears mesh with the center gear the hydraulic fluids between their teeth are displaced and causes hydraulic pressure in the pressure collection cavities #14 and #14'. This pressure is transferred through the fluid lines #16 and #16' to the annular port #28. As depicted by arrows in FIG. 2 this hydraulic pressure is valved through the valve line #29, through the valve line cavity #22, through the valve line #24 and into the slide cavity #23 where it acts on the center gear end lip #36 and pushes the center gear axially so that more of its teeth will mesh with the outer gears #12 and #12'. When a greater portion of the center gear teeth are meshing with the outer gear teeth there is a greater resistance to the gears turning because more fluid is displaced and those fluids must travel farther to get around the end of the center gears teeth. As the center gear is pushed over so that it is directly aligned with the two outer gears the hydraulic resistance to the meshing teeth becomes very great because the displaced fluids can no longer flow around the end of the center gears teeth, or any place else. The torque from the center gear is thus transferred to the housing unit and so to the output shaft #9 and therefore the clutch is engaged.

When the manual control lever #20 is moved to the left in FIG. 2, it moves the slide valve #18 to the right and closes in relation to annular port #28 and opens to annular port #27 so that the hydraulic vacuum in the vacuum collection cavities #15 and #15' can travle down the vacuum lines #17 and #17' to the annular port #27, Through the valve line #25, through the valve line cavity #22, through the valve line #24, and into the slide cavity #23 where it acts on the center gear #11 and pulls it back so that less of it meshes with the two outer gears #12 and #12'. This vacuum can pull the center gear back to the end of the splines on the outside of the input shaft #10. This position still allows the center gear #11 to mesh with the outer gears #12 and #12', but only to the extent that enough hydraulic pressure is maintained in the pressure collection cavities #14 and #14' to manipulate the center gear when need be. When the center gear is meshing with the outer gears at its smallest extent there is very little resistance to their meshing and so the outer gears can rotate freely and so the clutch is disengaged.

It should be obvious to anyone skilled in the art that many variations to the embodiment of my invention may be made without departing from the scope of my invention as defined in the following claims.

I claim:

1. A hydraulic clutch using a simple gear pump design comprising:

a rotatable housing unit made up of a front plate with an output shaft being fixed to this front plate and a rear plate which bolts to the front plate, and which contains four fluid lines for the control of the clutch, and which contains two pressure and two vacuum collection cavities which feed the four fluid lines, and which contains two annular ports for the four fluid lines from the collection cavities, and which has a center openning for the input shaft to enter;

an input shaft which is concentric with the output shaft, and this input shaft is splined partially on its outside so as to fit inside a splined center gear so that this center gear can slide axially on the input shaft and be driven by the input shaft, said input shaft has a center cyclindrical cavity for a control slide valve, said input shaft further has three valve lines which communicate between the housing unit and the control slide valve, said input shaft is partially splined on the inside so that the splined control valve can slide axially within the input shaft while rotating in unison with the input shaft;

a control slide valve which runs partially through the center of the input shaft said slidable value being concentric with said input shaft and further being, and is splined on one end so that it turns in unison with the input shaft, said slide valve and has a valve line cavity with three orifices inside of it to communicate with the three valve lines in the input shaft, said slide valve further has a throwout bearing wheel on the end extending from the input shaft which works in conjunction with a manual control lever and throwout bearing mounted on the supporting framework;

a center gear which is splined on its inside so that it can slide axially on the input shaft and be driven by said shaft, and which has a lip on one end so as to form a closed cavity in conjunction with the rear housing plate which the center gear can slide into to disengage the clutch or out of to engage the clutch;

two outside gears which mesh with the center gear, and which are each supported by a bearing pin which are in turn supported by the housing unit, and which forms two gear pump configurations with the center gear.

2. A hydraulic clutch device as claimed in claim 1 which incorporates gear pumps where the gears of the said gear pumps are forced to slide axially to each other by the use of hydraulic pressures or vacuums so as to engage or disengage said clutch device.

* * * * *